United States Patent
Zenkus et al.

(10) Patent No.: US 10,716,253 B2
(45) Date of Patent: Jul. 21, 2020

(54) FLEXIBLE LINE TRIMMER HEAD

(71) Applicant: Echo Incorporated, Lake Zurich, IL (US)

(72) Inventors: Joseph John Zenkus, Lake in the Hills, IL (US); Stephen J. Towner, Gurnee, IL (US); Ryan Garrett, Buffalo Grove, IL (US)

(73) Assignee: ECHO INCORPORATED, Lake Zurich, IL (US)

( * ) Notice: Subject to any disclaimer, the term of this patent is extended or adjusted under 35 U.S.C. 154(b) by 118 days.

(21) Appl. No.: 15/442,066

(22) Filed: Feb. 24, 2017

(65) Prior Publication Data

US 2018/0242520 A1 Aug. 30, 2018

(51) Int. Cl.
A01D 34/416 (2006.01)

(52) U.S. Cl.
CPC ....... *A01D 34/4165* (2013.01); *A01D 34/416* (2013.01)

(58) Field of Classification Search
CPC .............. A01D 34/4161; A01D 34/412; A01D 34/416; A01D 34/4162; A01D 34/4163; A01D 34/4165; A01D 2101/00
USPC .................................... 30/276, 347; 56/12.7
See application file for complete search history.

(56) References Cited

U.S. PATENT DOCUMENTS

| | | | | |
|---|---|---|---|---|
| 4,476,632 A * | 10/1984 | Proulx | ................. | A01D 34/416 30/276 |
| 5,020,223 A * | 6/1991 | Desent | ............... | A01D 34/4163 30/276 |
| 6,519,857 B1 * | 2/2003 | Proulx | ................. | A01D 34/416 30/276 |
| 6,952,877 B2 * | 10/2005 | Pfaltzgraff | ......... | A01D 34/4163 30/276 |
| 8,307,558 B2 * | 11/2012 | Alliss | ................. | A01D 34/4166 30/276 |
| 2003/0140503 A1 * | 7/2003 | Jerez | ...................... | A01B 1/065 30/276 |
| 2009/0172955 A1 * | 7/2009 | Morris | ............... | A01D 34/4163 30/276 |
| 2009/0282687 A1 * | 11/2009 | Arnetoli | ............. | A01D 34/4161 30/276 |
| 2010/0115909 A1 * | 5/2010 | Piccolo | ................ | A01D 34/416 56/295 |
| 2011/0302793 A1 * | 12/2011 | Alliss | ................. | A01D 34/4165 30/347 |
| 2012/0000079 A1 * | 1/2012 | Arnetoli | ............. | A01D 34/4163 30/347 |
| 2012/0066913 A1 * | 3/2012 | Alliss | ................. | A01D 34/4162 30/276 |
| 2012/0255218 A1 * | 10/2012 | Haroian | ................. | A01K 97/06 43/54.1 |

(Continued)

*Primary Examiner* — Phong H Nguyen
(74) *Attorney, Agent, or Firm* — Wood, Phillips, Katz, Clark & Mortimer

(57) ABSTRACT

A flexible line trimmer head has a housing with first and second parts and a spool for a supply of line. The first and second housing parts are configured to be moved from a spaced relationship towards each other along an operating axis whereupon cooperating connectors engage to block movement of the first and second housing parts away from each other along the axis. The cooperating connectors are provided in pairs at at least three different locations each spaced radially from the operating axis and in a circumferential direction from the other locations.

23 Claims, 5 Drawing Sheets

(56) References Cited

U.S. PATENT DOCUMENTS

2014/0325850 A1* 11/2014 Bone .................. A01D 34/4162
 30/276

* cited by examiner

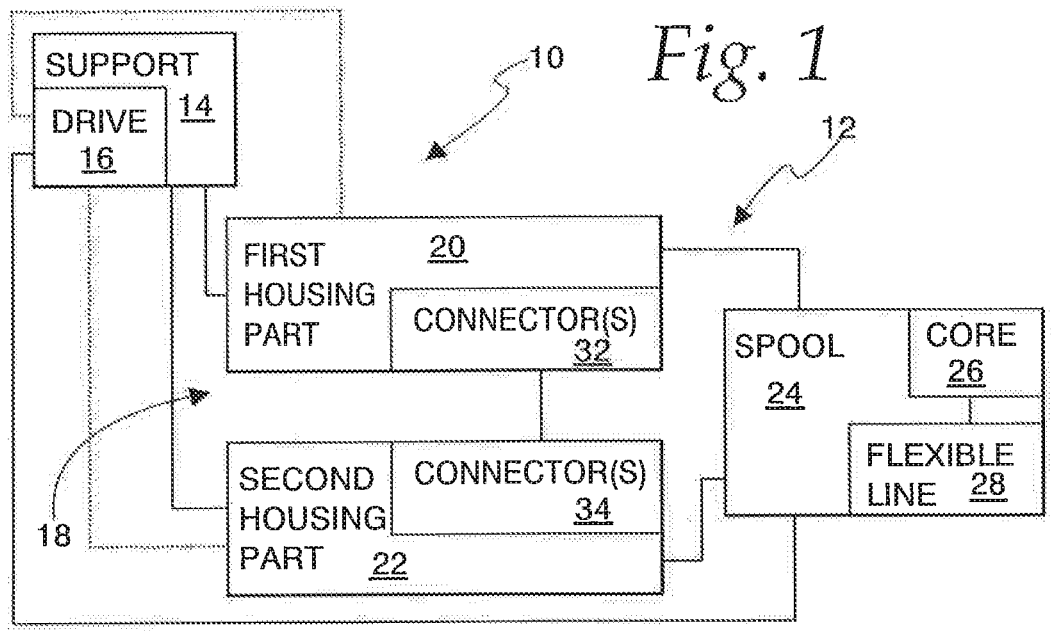
Fig. 1
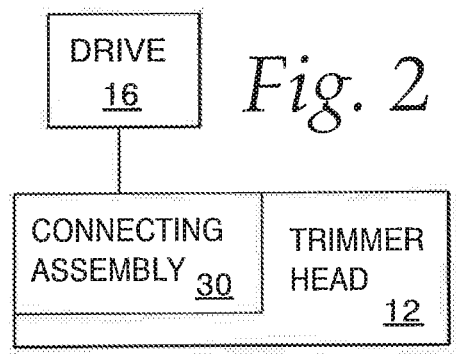
Fig. 2
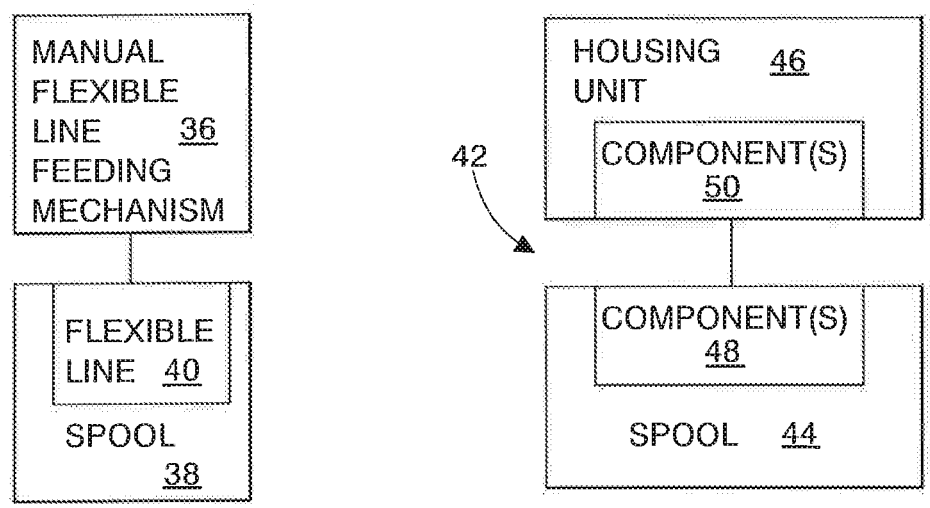
Fig. 3
Fig. 4

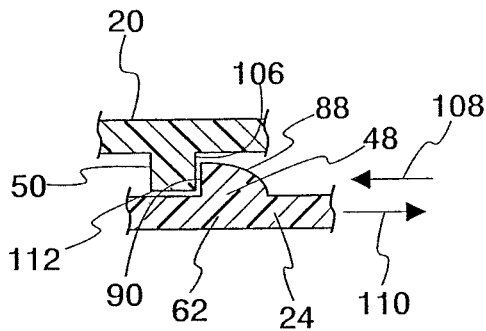
Fig. 8
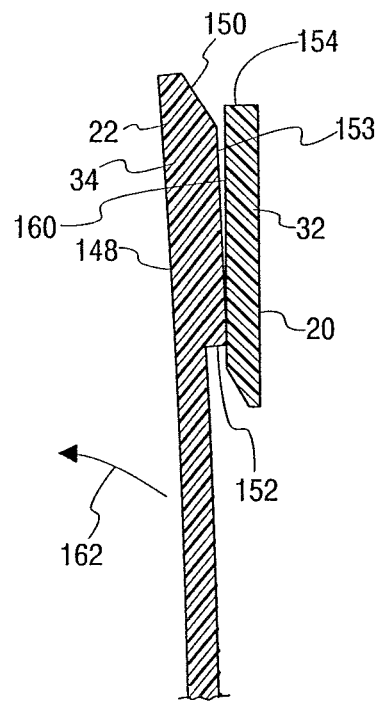
Fig. 11
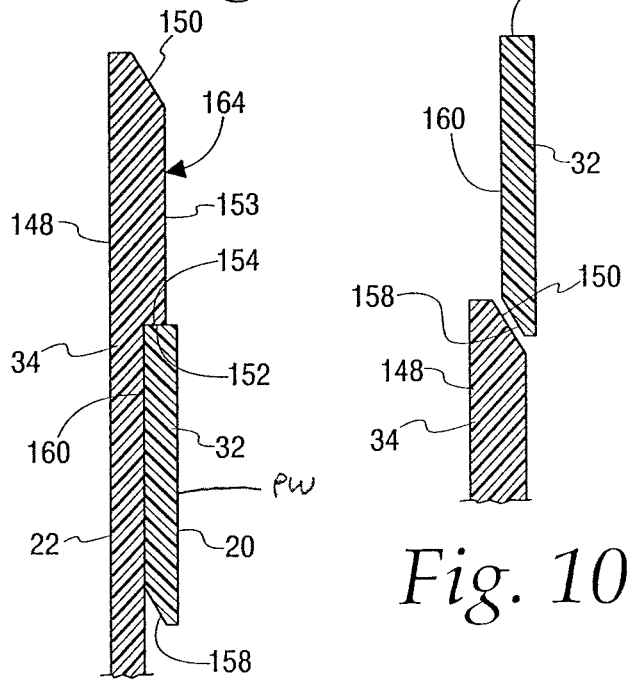
Fig. 9
Fig. 10
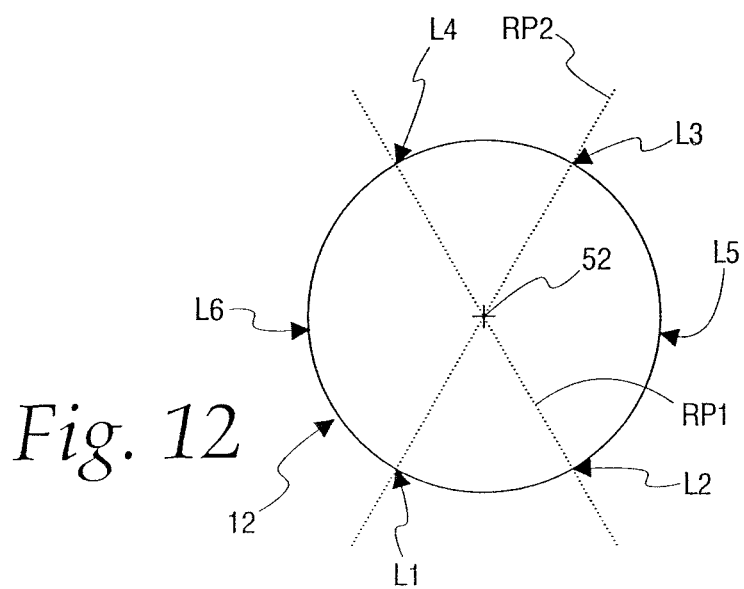
Fig. 12

FLEXIBLE LINE TRIMMER HEAD

BACKGROUND OF THE INVENTION

Field of the Invention

This invention relates to flexible line trimmers and, more particularly, to a flexible line trimmer head having separate housing parts that are latched together to cooperatively maintain a spool with a supply of flexible cutting line thereon in an operative position.

Background Art

A multitude of different flexible line trimmer heads have been developed for cutting vegetation. These heads have been incorporated into handheld units and units that are supported on wheeled carts.

Common to most of these designs is a main housing consisting of at least two parts that are separably connected. With the parts operatively connected, a line carrying spool is captively maintained in an operative position. Through different mechanisms, the line can be manually and/or automatically paid off of the spool to expose one or more discrete lengths that effect cutting as the head is turned by an appropriate drive in operation.

When the line supply is exhausted, or otherwise access is needed to the internal region of the housing, the housing parts are separated. For the convenience of the end user, the housing parts are typically snap fit together using latch arrangements designed so that no tools or separate fasteners are required to be manipulated as the housing parts are disassembled and re-assembled. A common design utilizes on each latch arrangement at least one bendable component. As the originally separated housing parts are aligned and relatively moved along an operating axis up to and against each other, the bendable latch components are caused to deflect radially to allow the fully assembled position to be realized, whereupon the bent latch components spring back towards an original state, thereby causing axially facing surfaces on the housing parts to be placed in confronting relationship such that separation of the housing parts is blocked.

With the housing parts assembled, the bendable latch components can be manually manipulated by the user to situate the previously confronting surfaces in a non-confronting relationship, whereupon the housing parts can be drawn away from each other to effect their separation. A typical construction utilizes bendable latch components that are configured to be engageable simultaneously by a user's separate fingers on one hand and pressed radially inwardly relative to the operating axis for the trimmer head.

Heretofore, two latch arrangements have been used at diametrically opposition locations. This configuration is desirable from the standpoint that the localized masses making up the latch components dynamically balance each other as the head is rotating.

One drawback with using only two diametrically opposite latch locations is that it is difficult to design the latch components so that the housing parts are maintained closely against each other both at time of manufacture and after substantial use of the head.

The heads are designed so that axially oppositely facing surfaces or edges on the housing parts are abutted or in close proximity over a substantial circumferential extent as the latch components assume their fully latched states. It can be difficult, particularly with plastic parts, to maintain tolerances closely enough that, once latched, the housing parts do not skew relative to each other. Often parts tolerances are such that a slight gap is maintained between the axially facing surfaces on the cooperating housing parts, over at least part of a circumferential extent where they are matched, with the latch components engaged. This permits a modicum of tipping of the housing parts, one relative to the other, generally about an axis extending through the rotary/operating axis and each of the latch arrangements. With heads rotating at relatively high speeds, this relative movement of the housing parts may produce a noticeable vibration from the point of initial operation. This condition may worsen as the plastic parts wear in use as they are repetitively moved back and forth against each other.

Heretofore, this problem has been addressed principally by designing the housing parts and latch components so that the housing parts are in close engagement substantially fully around the operating axis. While theoretically this will limit skewing of the housing parts, maintaining close tolerances, particularly with commonly used non-metal housing parts, is not practical. Even if close matching of parts occurs at time of manufacture, forces acting on non-metal parts may progressively cause detrimental wear.

The industry continues to seek better housing designs that involve balancing of the often competing objectives of controlling cost, reducing weight, and affording a dynamically balanced product that performs consistently over a normal anticipated life.

SUMMARY OF THE INVENTION

In one form, the invention is directed to a flexible line trimmer head consisting of a housing with a first part and a second part and a spool around which a supply of flexible line can be wrapped. The housing has an operating axis. The first and second housing parts are configured to be moved axially relative to each other between: a) a first state wherein the first and second housing parts are separated from each other; and b) a second state wherein the first and second housing parts are operatively connected. The housing and spool are configured so that the spool: a) is maintained in an operative position on the housing with the first and second housing parts in the second state; and b) can be separated from the housing with the first and second housing parts in the first state. The flexible trimmer head further includes a connecting assembly configured to be engaged by a drive that is operated to cause the first and second housing parts in the second state to be driven around the operating axis. The first and second housing parts have cooperating connector pairs at at least three locations. The cooperating connector pairs at each location are configured to block movement of the first and second housing parts axially away from each other with the first and second housing parts in the second state. Each of the locations is spaced: a) radially from the operating axis; and b) in a circumferential direction from the other locations.

In one form, the first and second housing parts have cooperating connector pairs at at least four locations. Each of the locations is spaced: a) radially from the operating axis; and b) in a circumferential direction from the other locations.

In one form, a first of the cooperating connector pairs has a first repositionable arm with a surface/edge facing a first axial direction on one of the first and second housing parts and a surface/edge on the other of the first and second housing parts facing oppositely to the first axial direction. The housing is configured so that with the first and second housing parts in the first state, relative movement of the first and second housing parts axially towards and against each other causes at least a part of the first repositionable arm to be deflected radially in one direction by the other of the first and second housing parts to allow the surfaces/edges on the first and second housing parts to move up to and past each other. With the first and second housing parts realizing the second state, the at least part of the first repositionable arm moves radially oppositely to the one direction so that the surfaces/edges are in confronting relationship so as to block movement of the first and second housing parts axially away from each other at the location of the first cooperating connector pairs.

In one form, each of the cooperating connector pairs has the same construction as the first cooperating connector pair.

In one form, the first repositionable arm is a cantilevered arm that bends to allow the surface/edge on the first repositionable arm to move in radial opposite directions.

In one form, the one of the first and second housing parts has a molded body. The first repositionable arm is molded as one part of the body.

In one form, first and second of the cooperating connector pairs are at diametrically opposite first and second of the locations and are substantially symmetrical on opposite sides of a first reference plane including the operating axis. Third and fourth of the cooperating connector pairs are at diametrically opposite third and fourth of the locations and are substantially symmetrical on opposite sides of a second reference plane including the operating axis.

In one form, the first and second reference planes are non-orthogonal to each other.

In one form, the housing further includes diametrically opposite openings each of which is configured to allow passage of a length of flexible line from the spool radially to outside of the housing.

In one form, the housing further includes diametrically opposite openings at fifth and sixth locations. Each opening is configured to allow passage of a length of flexible line from the spool radially to outside of the housing. The first, second, third, fourth, fifth, and sixth locations are spaced substantially uniformly from each other in a circumferential direction.

In one form, there is a first tab on one of the first and second housing parts and a first notch on the other of the first and second housing parts. The first tab and first notch are configured to cooperate with each other to key the first and second housing parts against relative movement around the operating axis.

In one form, there are first and second tabs and first and second notches on the first and second housing parts. The first tab and first notch are configured to cooperate with each other to key the first and second housing parts against relative movement around the operating axis at one location. The second tab and second notch are configured to cooperate with each other to key the first and second housing parts against relative movement around the operating axis at a location spaced circumferentially from the one location.

In one form, the spool has a core. The spool is provided in combination with a supply of flexible line wrapped around the spool core.

In one form, the housing has a top and a bottom spaced axially from the top. The flexible line trimmer head further includes a knob at the top of the housing that is connected to the spool and configured to be turned guidingly around the operating axis to thereby turn the spool relative to the housing parts around the operating axis.

In one form, the flexible line trimmer head is configured so that an engaged drive causes the spool to turn the first and second housing parts around the operating axis.

In one form, the first and second housing parts make up a housing unit. There are components cooperating between the spool and housing unit that are configured to allow incremental turning of the housing unit relative to the spool upon the housing unit and spool being momentarily axially moved relative to each other with the housing unit driven around the operating axis.

In one form, the first and second housing parts make up a housing unit. A spring biasing structure urges the housing unit in one axial direction relative to the spool.

In one form, the invention is directed to a housing unit consisting of the first and second housing parts described above.

In one form, the first and second housing parts have cooperating connector pairs at at least four locations. Each of the locations is spaced: a) radially from the operating axis; and b) in a circumferential direction from the other locations.

In one form, first and second of the cooperating connector pairs are at diametrically opposite first and second of the locations and are substantially symmetrical on opposite sides of a first reference plane including the operating axis. Third and fourth of the cooperating connector pairs are at diametrically opposite third and fourth of the locations and are substantially symmetrical on opposite sides of a second reference plane including the operating axis. The first and second reference planes are non-orthogonal to each other.

BRIEF DESCRIPTION OF THE DRAWINGS

FIG. 1 is a schematic representation of a flexible line trimmer incorporating a trimmer head, according to the present invention;

FIG. 2 is a schematic representation of connecting structure between a drive and the trimmer head in FIG. 1;

FIG. 3 is a schematic representation of a structure for manually extending line from a spool on the inventive trimmer head in FIG. 1;

FIG. 4 is a schematic representation of a structure for automatically extending line from the spool;

FIG. 8 is a fragmentary, cross-sectional view showing cooperation between components, as shown schematically in FIG. 4;

FIG. 9 is a fragmentary, cross-sectional view of one form of connector, shown schematically on one housing part in FIG. 1, taken along line 9-9 of FIG. 5, and a cooperating connector on the other housing part with the housing parts in an engaged state;

FIGS. 10 and 11 are schematic representations, corresponding to the view in FIG. 9, and showing the transition of the connectors in FIG. 9 into an engaged position; and FIG. 12 is a reduced, schematic, plan view of the trimmer head in FIGS. 5-7.

DETAILED DESCRIPTION OF THE PREFERRED EMBODIMENT

Figure 5:
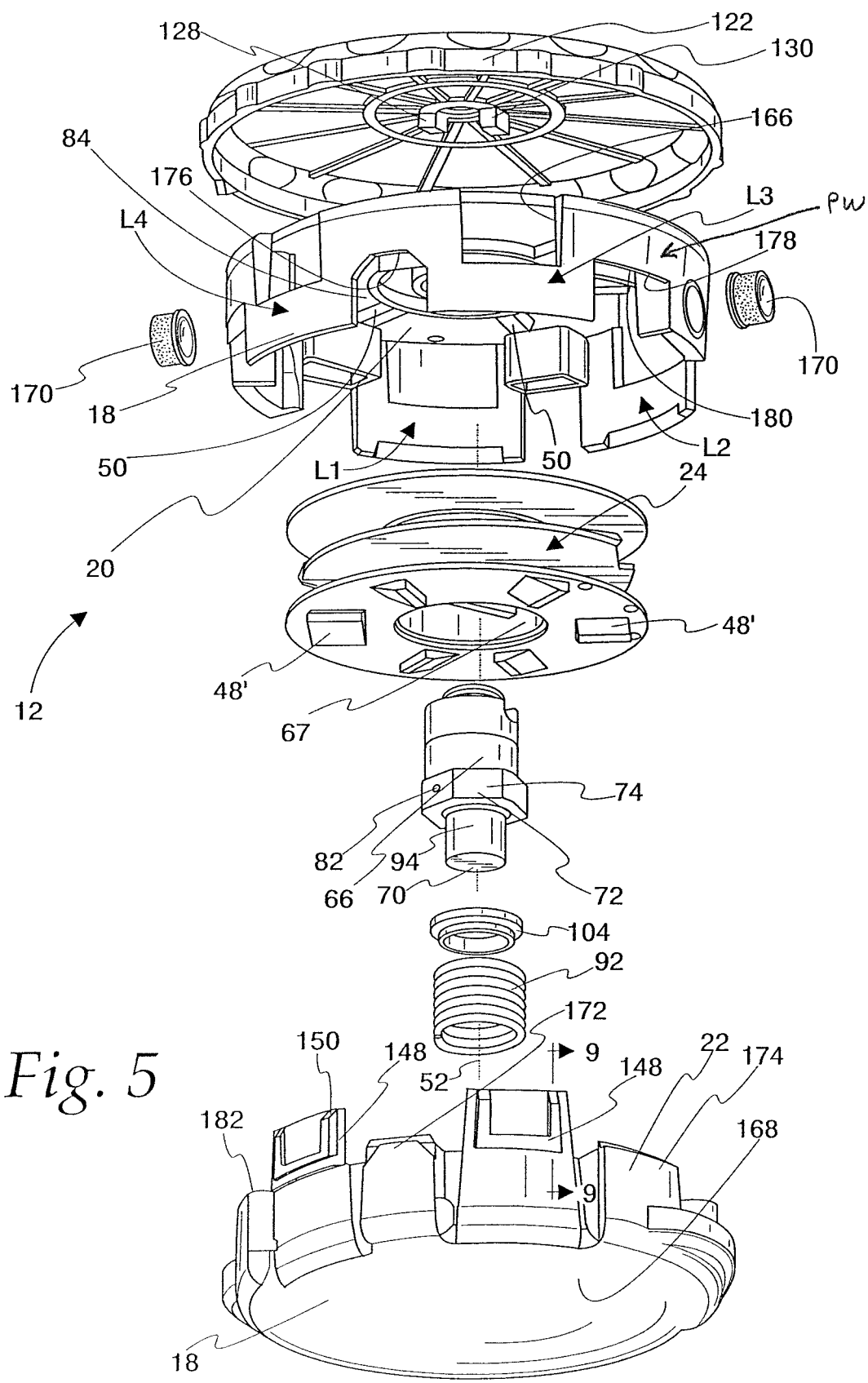
FIG. 5 is an exploded, perspective view of one exemplary form of the inventive trimmer head, as shown in schematic form in FIG. 1.

In FIG. 1, a schematic representation of a flexible line trimmer is shown at 10, including a rotatable trimmer head, according to the invention, at 12. The head 12 is mounted on a support 14, which represents a multitude of different types of support that currently exist. The support 14 might be a wheeled carriage, a frame that is part of a portable unit that can be carried by a user, etc. The support 14 incorporates a suitable drive 16 for the trimmer head 12.

The trimmer head 12 consists of a housing 18 made up of a first part 20 and a second part 22. The housing 18 has an operating axis around which it moves when powered by the drive 16.

The trimmer head 12 further includes a spool 24 with a core 26 around which a supply of flexible line 28 is wrapped.

The first and second housing parts 20, 22 are configured to be moved axially relative to each other between: a) a first state wherein the first and second housing parts 20, 22 are separated from each other; and b) a second state wherein the first and second housing parts 20, 22 are operatively connected.

The housing 18 and spool 24 are configured so that the spool 24: a) is maintained in an operative position on the housing 18 with the first and second housing parts 20, 22 in the second state; and b) can be separated from the housing 18 with the first and second housing parts 20, 22 in the first state.

As shown additionally in FIG. 2, the trimmer head 12 further includes a connecting assembly 30 configured to be engaged by the drive 16 that is operated to cause the housing parts 20, 22 in their second state to be driven, direct or indirectly, around the operating axis.

The first and second housing parts 20, 22 respectively have connectors 32, 34 that cooperate in pairs at at least three different locations. At each location, the connector pairs 32, 34 are configured to block movement of the first and second housing parts 20, 22 axially away from each other with the first and second housing parts 20, 22 in their second state.

Each of the locations where the connector pairs 32, 34 interact is spaced: a) radially from the operating axis; and b) in a circumferential direction from the other locations.

The schematic showing of the flexible line trimmer 10 in FIGS. 1 and 2 is intended to encompass a wide range of different constructions into which the present invention can be incorporated. The invention contemplates many variations in the basic components depicted as well as their interactions. The construction described hereinbelow is intended to be representative in nature only.

To understand the invention, it is not necessary to understand many details of the trimmer head construction. An exemplary trimmer head, consistent with the basic design of the exemplary unit described hereinbelow, is described in Applicant's U.S. Pat. No. 6,952,877, with inventor Pfaltzgraff. The entire disclosure in U.S. Pat. No. 6,952,877 is incorporated herein by reference.

It should be noted that the invention can be incorporated into a trimmer head that requires manual feeding out of flexible line or one that has one of a potentially wide range of different feeding mechanisms that extend line out automatically, including those that require impacting of the trimmer head upon a hard surface to effect controlled incremental line feeding as the trimmer head is rotated in operation.

In FIG. 3, a manual flexible line feeding mechanism is shown schematically at 36 in association with a spool 38 upon which a supply of flexible line 40 is wrapped.

In FIG. 4, a schematic representation of an automatic line feed mechanism, usable as part of the present invention, is shown in schematic form at 42. The mechanism 42 has a spool 44 that interacts with a housing unit 46 made up of first and second housing parts, as depicted in FIG. 1. Components 48, 50, respectively on the spool 44 and housing unit 46, cooperate and are configured to allow incremental turning of the housing unit 46 relative to the spool 44 upon the housing unit 46 and spool 44 being momentarily axially moved relative to each other as the housing unit 46 is being turned/rotated by the drive 16.

The particular details of line feeding mechanism are not critical to the present invention as the invention can be incorporated into any structure that has either a manual line feed capability, as shown schematically in FIG. 3, or an automatic feed capability, as shown schematically in FIG. 4 and in Pfaltzgraff's U.S. Pat. No. 6,952,877.

Details of one preferred form of the invention, within the schematic showings in FIGS. 1-4, will now be described with respect to FIGS. 5-12.

The depicted line trimmer head 12 has the aforementioned housing 18 with first and second parts 20, 22, respectively. In most designs, the first housing part 20 is an "upper" part and the second housing part 22 is a "lower" part. The housing 18 has an operating axis 52.

The flexible line 28 is wrapped around the core 26 on the spool 24. The spool 24 has a dividing flange 56 which bounds separate, axially spaced, line storage spaces 58, 60, respectively in conjunction with upper and lower flanges 62, 64.

Figure 6:
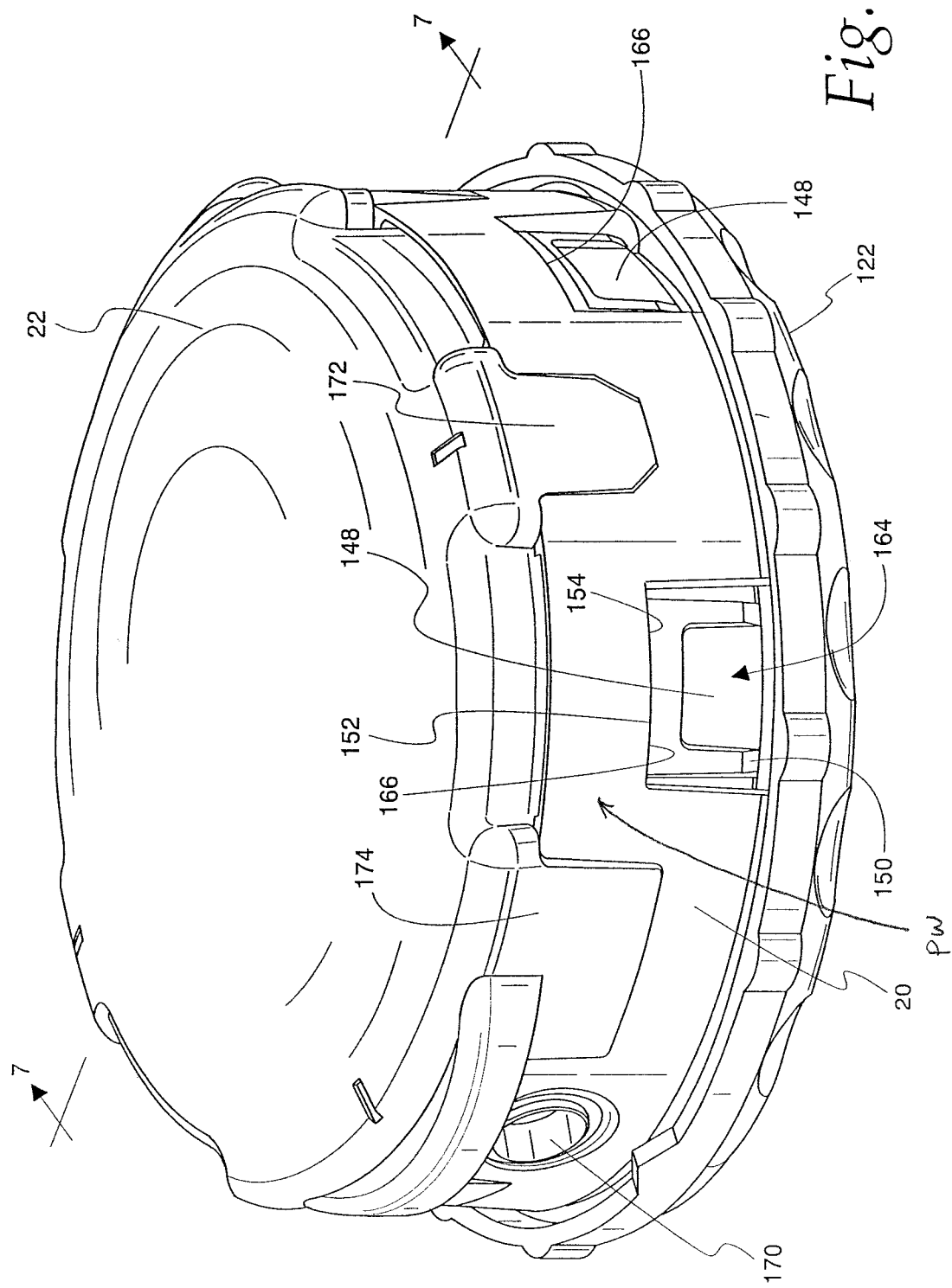
FIG. 6 is an enlarged, bottom, perspective view of the trimmer head in FIG. 5 in an assembled state.
Figure 7:
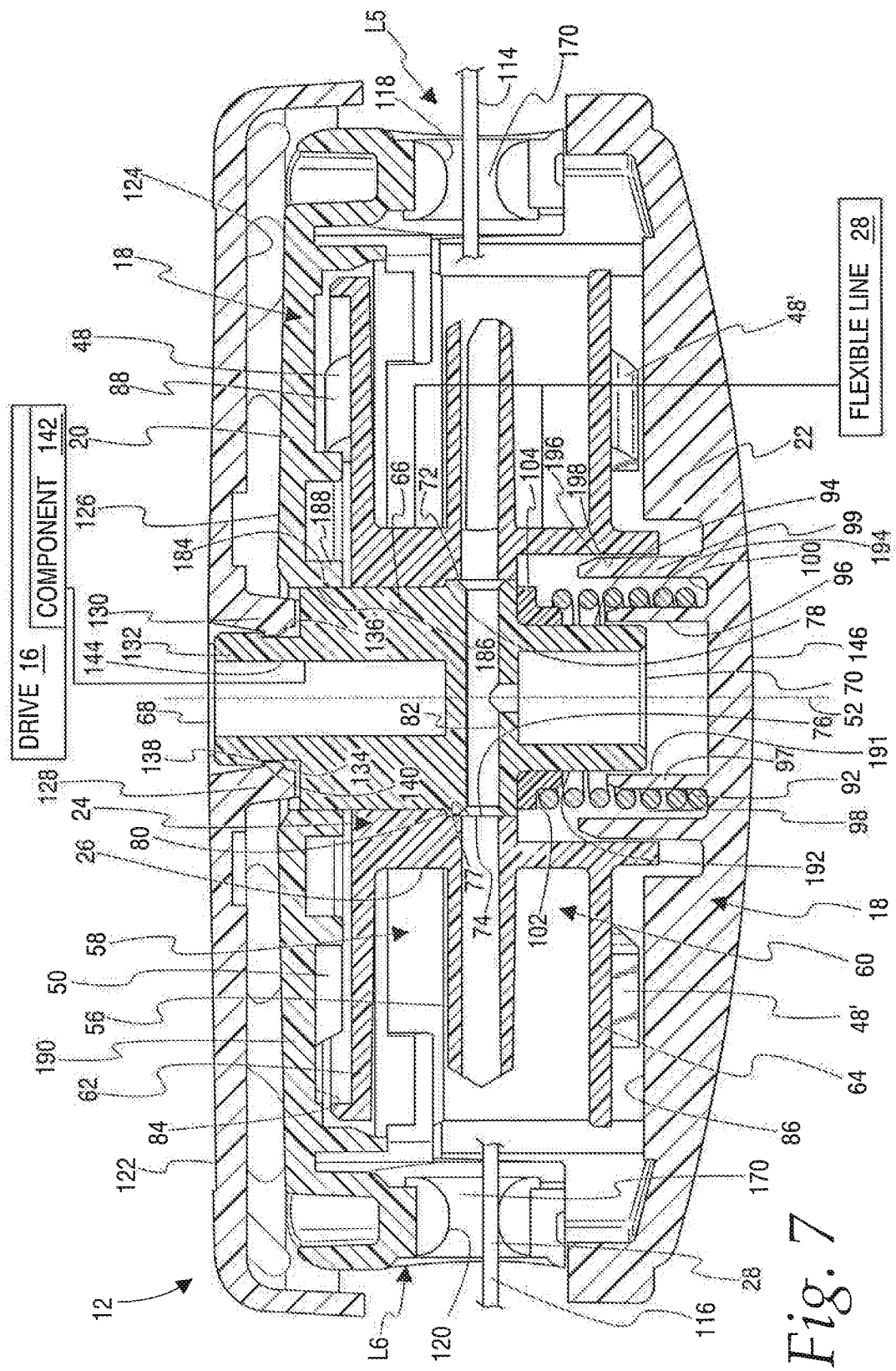
FIG. 7 is a cross-sectional view of the trimmer head taken along line 7-7 of FIG. 6.

As described above, the first and second housing parts 20, 22 have first and second states—a first state as shown in FIG. 5, wherein the first and second housing parts 20, 22 are separated from each other, and a second state, as shown in FIGS. 6 and 7, wherein the first and second housing parts 20, 22 are operatively connected.

As seen in FIG. 7, with the first and second housing parts 20, 22 in their second state, the operatively positioned spool 24 is captively maintained in an operative position. As seen in FIG. 5, with the first and second housing parts 20, 22 in their first state, the spool 24 can be separated from the housing 18 or positioned for assembly.

In this embodiment, the head 12 includes a unitary shaft 66 that extends between the first and second housing parts 20, 22 and through an axial bore 67 through the spool 24. The shaft 66 has axially opposite ends 68, 70. The shaft 66 has a stepped diameter.

At an axial mid-portion, the shaft 66 is radially enlarged at 72 to define a polygonally-shaped perimeter surface 74 that nests in a matching receptacle 76 on the spool 24 and against a part of a surface 77 of the spool 24 bounding the bore 67 so that the spool 24 and shaft 66 are keyed to rotate together around the axis 52.

Axially oppositely facing, annular shoulders 78, 80, respectively on the spool 24 and shaft 66, abut to consistently maintain a predetermined axial relationship between the shaft 66 and spool 24 wherein a through opening/bore 82 in the shaft 66 aligns with the flange 56 to allow a single length of the line 28 to be directed radially into and through the bore 82. The line 28 projecting from one end of the bore 82 is wrapped in one direction around the core 26 within the line storage space 58. The line 28 projecting from the other end is wrapped oppositely around the core 26 within the line storage space 60.

With the first and second housing parts 20, 22 in their second state, as shown in FIG. 7, the spool 24 is captively maintained in its operative position. More specifically, the spool 24 is captively maintained between axially oppositely facing surfaces 84, 86, respectively on the first and second housing parts 20, 22.

The upper flange 62 has a plurality of the aforementioned components 48 projecting upwardly therefrom. The components 48 are spaced radially from the axis 52 and circumferentially around the axis 52 at regular intervals. Each component 48 has a ramp surface 88 and a blocking surface 90, as seen most clearly in FIG. 8.

The components 48 cooperate with the components 50 that extend downwardly from the housing part surface 84. The components 50 extend radially from the axis 52 with six such components 50 shown in the exemplary form. The components 48, 50 may be the same, or different, in number. The components 50 reside in the path of the components 48 as the spool 24 is turned relative to the housing 18 around the axis 52.

The shaft 66 and spool 24 are urged axially upwardly by a biasing component in the form of a coil spring 92 that surrounds a reduced diameter portion 94 of the shaft 66 at its end 70. The reduced diameter portion 94 is guided vertically within a blind receptacle 96 bounded by a boss 97 on the housing part 22. The spring 92 fits within a separate, surrounding, annular receptacle 98 on the housing part 22, bounded by the first boss 97 and a second concentric boss 99, and is captive between a surface 100 on the housing part 22 and a shoulder 102 defined by a cap 104, surrounding the reduced diameter post portion 94 and nested at the juncture between the radially enlarged region at 72 and the reduced diameter portion 94. Thus, a constant bias force is normally produced by the spring 92 urging the shaft 66 and spool 24 axially upwardly to the position shown in FIG. 7.

With the spool 24 in this position, the blocking surfaces 90 on the components 48 axially overlap with blocking surfaces 106 on the components 50. The components 48, 50 are shown to be equal in number and arranged to cooperate simultaneously in the same manner. That is, as the spool 24 is turned in one direction, indicated by the arrow 108 in FIG. 8, the blocking surfaces 90, 106 abut to cause the first housing part 20 to turn therewith. As explained in greater detail below, the housing part 22 is connected to the housing part 20, to turn as one piece therewith.

By turning the spool 24 in the direction of the arrow 110 in FIG. 8, the ramp surfaces 88 are caused to engage edges 112 on the components 50, which produces a camming action that progressively moves the spool 24 and shaft 66 axially downwardly away from the housing part 20 against the force of the spring 92 until the components 48, 50 move past each other, whereupon the compressed spring 92 urges the spool 24 and shaft 66 axially upwardly into the FIG. 7 position. The relative turning of the spool 24 and housing 18 causes an unwinding of an increment of the line 28 in the line storage spaces 58, 60 so that free end portions 114, 116 of the line 28, that project through diametrically opposite housing openings 118, 120, project further outwardly to increase their cutting lengths.

The feeding out of the line 28 can be effected manually with the head 12 stationary, or through a bumping action with the head 12 turning in operation. In the former case, a graspable cap 122 is used to turn the unitary shaft 66. The cap 122 has an inverted cup shape to produce an umbrella shape over, and axially overlapping, the housing part 20. In a normal state for the head 12, a downwardly facing surface 124 on the cap 122 is spaced slightly above the top surface 126 of the housing part 20.

The cap 122 has a pair of posts 128, 130 which straddle a reduced diameter portion 132 of the shaft 66 at its end 68 and nest in complementary receptacles 134, 136 against the shaft 66. A snap fit connection can be effected as shown for exemplary post 128 in receptacle 134 so that the shaft follows turning movement of the cap 122. With the post 128 fully seated, an axially facing shoulder 138 thereon snaps under an axially oppositely facing shoulder 140 on the shaft 66. The post 130 may be snap fit in similar fashion into its receptacle 136.

By grasping and turning the cap 122 in one direction, the shaft 66 and spool 24 follow by moving in the direction of the arrow 110. The spool 24 can be continuously turned, moving axially upwardly and downwardly as the components 48, 50 repetitively interact and separate.

The head 12 is rotated by the drive 16 through a component 142 that engages a threaded bore 144 on the shaft 66 to make up the aforementioned connecting assembly 30. The thread direction is such that as the drive 16 is operated, this threaded connection is tightened. The axially upper end region of the shaft 66 defines a connecting part with threads that remain exposed to facilitate operative engagement of the drive 16 through the threaded component 142.

As the shaft 66 is driven, the shaft 66 drives the spool 24 which in turns drives the housing 18 through the cooperating components 48, 50. The rotational direction of the spool 24 is as indicated by the arrow 108 in FIG. 8, such that the blocking surfaces 90 on the components 48 engage and drive the blocking surfaces 106 on the components 50. The user can effect incremental line extension by tapping the bottom surface 146 of the housing part 22 against a hard surface as the housing 18 is rotating. As this occurs, the shaft 66 and spool 24 together move momentarily axially downwardly so as to compress the spring 92. This disengages the components 48, 50 until the restoring force in the compressed spring 92 returns the shaft 66 and spool 24 to their original upward positions.

The spool 24 is constructed so that it can be inverted to accommodate different drive directions for the trimmer head 12. The flange 64 has connectors 48' that are oppositely arranged but cooperate with the components 50 otherwise in the same fashion that the connectors 48 cooperate therewith.

The housing parts 20, 22 are maintained in their second, connected state by at least three pairs of the cooperating connectors 32, 34 at spaced locations and configured to produce a snap fit latching arrangement. Each of the locations is spaced: a) radially from the operating axis 52; and b) in a circumferential direction from the other locations. The first and second housing parts 20, 22, in the second state, are blocked by the cooperating connectors 32, 34 from moving axially away from each other.

Each connector 34 is in the form of a repositionable, cantilevered latch arm 148 with a leading cam surface 150. The arm 148 further has a surface/edge 152 facing in one axial direction. The arm 148 has a cam surface 153 that extends from the cam surface 150 up to the surface/edge 152.

Each connector 32 has a surface/edge 154 facing axially oppositely to the surface/edge 152 with the housing parts 20, 22 in their second state, as shown in FIGS. 7 and 9. Each surface/edge 154 is defined on a peripheral wall PW on the housing part 20 extending around the axis 52. The connector 32 has a cam surface 158 that blends into a separate cam surface 160 that extends up to the surface/edge 154.

In the depicted embodiment, the connector pairs 32, 34 are provided at four circumferentially spaced locations L1, L2, L3, L4 on the head 12. Each of the cooperating connector pairs 32, 34 has the same construction with the connectors 32, 34 cooperating in the same fashion to cooperatively maintain the housing parts 20, 22 together in their second state.

As shown in FIGS. 10 and 11, with the housing parts 20, 22 initially in their first state and axially aligned as in FIG. 10, movement of the housing parts 20, 22 axially towards and against each other causes the cam surface 150 on each connector 34 to engage the cam surface 158 on the connector 32. As this relative movement continues, the cooperating cam surfaces 150, 158 cause the arm 148 to progressively bend radially inwardly, as indicated by the arrow 162. The bending of the arm 148 continues until the cam surface 153 comes into contact with the cam surface 160, as seen in FIG. 11. Continued relative movement, which is guided by the engaged cam surfaces 153, 160, causes the surfaces/edges 152, 154 to move towards each other and eventually past each other, whereupon the arm 148 springs radially outwardly to place the surfaces/edges 152, 154 in confronting/blocking relationship, as shown in FIG. 9.

With the housing parts 20, 22 in their second state, the free end region 164 of each arm 148 is exposed at an opening 166 on the housing part 20 such that a radially inward force can be applied thereagainst to bend the arm 148 radially inwardly to thereby move the surfaces/edges 152, 154 out of confronting relationship, whereby the housing parts 20, 22 can be separated.

With this arrangement, the housing parts 20, 22 can be axially aligned in their first state and pressed together to thereby be snap fit and latched/held together in their second state. Of course, the cooperating connector parts could be reversed, whereby the bendable arms 148 are on the housing part 20. Alternatively, one or more bendable arms may be provided on each of the housing parts 20, 22.

In the depicted form, the arms 148 are molded as one piece with a body 168 making up the remainder of the housing part 22. Both of the housing parts are preferably molded from a non-metal material such as a plastic, a composite, etc.

In the exemplary form, the connector pairs 32, 34 at the locations L1 and L3 are at diametrically opposite positions. Similarly, the connector pairs 32, 34 at the locations L2 and L4 are at diametrically opposite positions. The connector pairs 32, 34 at the locations L1 and L3 are symmetrical on opposite sides of a reference plane RP1, including the operating axis 52. The connector pairs 32, 34 at the locations L1 and L3 are likewise symmetrical about a separate reference plane RP2 including the operating axis 52. As depicted, these reference planes RP1, RP2 are non-orthogonal to each other. The locations L1, L2, L3, L4 are spaced circumferentially from each other at the annular outer wall of the housing.

Inserts 170 of like construction are placed within the housing 18 and actually define the openings 118, 120, which are at fifth and sixth diametrically opposite locations L5, L6, which reside between circumferentially adjacent locations L1, L4 and L2, L3 which are spaced from each other a greater distance than are the circumferentially adjacent locations L1, L2 and L3, L4.

In the depicted embodiment, the locations L1-L6 are spaced substantially uniformly from each other in a circumferential direction.

The housing part 22 has a series of cantilevered, axially projecting tabs 172, 174 that alternate around the circumference of the housing part 22. The tab 174 has a generally square shape, with the tab 172 having a slightly different polygonal shape.

The tabs 172, 174 are translatable into and out of complementarily-shaped notches 176, 178, respectively, on the housing part 20, as the housing parts 20, 22 are changed between the first and second states without requiring any direct manipulation of the tabs 172, 174 by a user. The tabs 172, 174 nest in their respective notches 176, 178 as the housing parts 20, 22 are changed from their first state into their second state. The tabs 172, 174 and cooperating notches 176, 178 are configured to cooperate to key the first and second housing parts 20, 22 against relative movement around the operating axis 52 at the circumferentially spaced locations at which the tabs 172, 174 and notches 176, 178 cooperate. As depicted, the tabs 172, 174 and notches 176, 178 alternate and are spaced approximately equidistantly around the circumference of the housing part 20. The notches 176, 178 are formed in an annular outer wall on the housing part 20 and extend over a substantial axial extent of the annular outer wall, as seen most clearly in FIG. 5, so as to stabilize the joined housing parts 20, 22.

With the housing parts 20, 22 operatively connected and the latch arms 148 snap fit into place, an edge 180 on the housing part 20 abuts to a facing edge 182 on the housing part 22. The edges 180, 182 follow the contours of their respective body parts around the tabs 172, 174 and notches 176, 178 to engage substantially fully and continuously around the axis 52. The notches 176, 178 are formed through the exposed outside surface facing radially outwardly on the housing part 20, as seen clearly in FIG. 5. The edges 180, 182 preferably engage at least in the regions between where the connectors 32, 34 reside to stabilize the housing parts 20, 22 against tipping/skewing. The portions of the edge 180 bounding the notches 176, 178 engage the edge 182 over a substantial axial extent to thereby stabilize the relationship of the central axes of the housing parts 20, 22.

The unitary shaft 66 is preferably made from a metal material. By extending fully axially between, and connecting to, each of the first and second housing parts 20, 22, the shaft stabilizes the housing parts 20, 22 to thereby maintain a desired aligned relationship therebetween. By reason of the metal construction of the shaft 66, other cooperating parts of the housing 12, made from non-metal materials, are not prone to welding to the shaft 66 over time after extended use of the trimmer head 12.

The required rigidity for the shaft 66 can be achieved by making the shaft 66 as a single piece or from separate metal pieces that are fixedly connected. For example, the pieces might be welded.

In a preferred form, the shaft 66 is a single, machined piece. Of course, machining of a welded piece is also contemplated. Machining allows the shaft 66 to be precisely formed with close tolerances.

Weight can be controlled by using a lightweight metal such as aluminum.

Stability is enhanced by having an outer annular surface portion 184 at the top region of the shaft 66 engaged with a radially inwardly facing annular surface 186 over substantially the entire axial dimension of a boss 188 that locally thickens the upper wall 190 of the housing part 20.

The lower region of the shaft 66, the spool 24, and housing part 22 interact in a manner to likewise maintain alignment of the housing parts 20, 22 and their structural relationship with the spool 24.

The upwardly projecting bosses 97, 99 effectively thicken and rigidify the housing part 22 and further create enlarged contact areas between the housing part 22 and each of the shaft 66 and spool 24 to thereby stabilize the relationship between these components and positively guide their relative movement.

More specifically, the boss 97 defines a radially inwardly facing annular surface 191 that cooperates with a radially outwardly facing surface portion 192 on the reduced diameter portion 94 of the shaft 66. The shaft 66 thus translates axially and turns around the axis 52 smoothly relative to the housing part 22 while stably maintaining the relationship of the housing part 22 to the operating axis 52. A radially outwardly facing surface 194 on the boss 97 supports the coil spring 92 that extends therearound.

The spool 24 in turn is stably supported for guided movement relative to the second housing part 22 by the boss 99. The boss 99 has a radially outwardly facing annular surface 196 that bears against a radially inwardly facing annular surface 198 on the bottom portion of the spool 24. This arrangement stabilizes the spool 24 and smoothly guides movement of the spool 24 both axially relative to the second housing part 22 and as it turns relative to the housing part 22 around the axis 52.

The mid to upper region of the spool 24 conforms closely to the shaft 66 and is thus stably supported directly by the shaft 66 in that region.

Thus, the housing parts 20, 22 are stably supported by the rigid metal shaft 66, with additional stabilizing of the relationship of the housing parts 20, 22 and shaft 66 afforded by the spool 24 interacting primarily between the shaft 66 and housing part 22.

With a precisely formed metal shaft 66 defining the structural foundation for the other components on the trimmer head 12, the number of interacting parts can be reduced. Detrimental stacking of tolerances may thus be avoided, as is a resulting imbalanced stack-up. Consistent, balanced alignment of parts may be maintained for the useful life expectancy for the trimmer head 12.

With the above described arrangement, the three or more connecting locations L1-L4 stabilize the housing parts 20, 22 against tipping relative to each other, thereby to further maintain overall balance and parts alignment. The latch locations could exceed the four shown.

The foregoing disclosure of specific embodiments is intended to be illustrative of the broad concepts comprehended by the invention.

The invention claimed is:

1. A flexible line trimmer head comprising:
a housing comprising a first part and a second part each having a central axis,
the housing having an operating axis;
a spool around which a supply of flexible line can be wrapped and having an axis,
the first and second housing parts configured to be moved axially relative to each other between: a) a first state wherein the first and second housing parts are separated from each other; and b) a second state wherein the first and second housing parts are operatively connected,
the housing and spool configured so that the spool: a) is maintained in an operative position on the housing between portions of the first and second housing parts with the first and second housing parts in the second state; and b) can be separated from the housing with the first and second housing parts in the first state; and
the flexible trimmer head further comprising a connecting assembly configured to be engaged by a drive that is operated to cause the first and second housing parts in the second state to be driven around the operating axis,
the first and second housing parts having cooperating connector pairs at at least three locations,
the cooperating connector pairs at each location configured to block movement of the first and second housing parts axially away from each other with the first and second housing parts in the second state,
each of the locations spaced: a) radially from the operating axis; and b) in a circumferential direction from the other locations,
wherein a first of the cooperating connector pairs comprises a first repositionable arm with a surface/edge facing a first axial direction on one of the first and second housing parts and a surface/edge on the other of the first and second housing parts facing oppositely to the first axial direction,
wherein the housing is configured so that with the first and second housing parts in the first state, relative movement of the first and second housing parts axially towards and against each other causes at least a part of the first repositionable arm to be deflected radially in one direction by the other of the first and second housing parts to allow the surfaces/edges on the first and second housing parts to move up to and past each other whereupon with the first and second housing parts realizing the second state the at least part of the first repositionable arm moves radially oppositely to the one direction so that the surfaces/edges are in confronting relationship so as to block movement of the first and second housing parts axially away from each other at the location of the first cooperating connector pairs,
wherein the other of the first and second housing parts has a peripheral wall extending around the operating axis and the surface/edge on the other of the first and second housing parts is on the peripheral wall,
wherein there is a first tab on one of the first and second housing parts and a first notch on the other of the first and second housing parts, the first tab and first notch configured to cooperate with each other at a location spaced from the cooperating connector pairs to key the first and second housing parts against relative movement around the operating axis, the first tab movable into and out of the first notch as the first and second housing parts are changed back and forth between the first and second states without requiring any direct manipulation of the first tab by a user,
wherein the other of the first and second housing parts has an annular wall with an exposed outside surface facing radially outwardly and the first notch extends through the exposed outside surface.

2. The flexible line trimmer head according to claim 1 wherein the first and second housing parts have cooperating connector pairs at at least four locations, each of the locations spaced: a) radially from the operating axis; and b) in a circumferential direction from the other locations.

3. The flexible line trimmer head according to claim 2 wherein first and second of the cooperating connector pairs are at diametrically opposite first and second of the locations and are substantially symmetrical on opposite sides of a first reference plane including the operating axis and third and fourth of the cooperating connector pairs are at diametrically opposite third and fourth of the locations and are substantially symmetrical on opposite sides of a second reference plane including the operating axis.

4. The flexible line trimmer head according to claim 2 wherein the housing further defines diametrically opposite openings each of which is configured to allow passage of a length of flexible line from the spool radially to outside of the housing.

5. The flexible line trimmer head according to claim 2 wherein the housing further defines diametrically opposite openings at fifth and sixth locations each of which is configured to allow passage of a length of flexible line from the spool radially to outside of the housing and the first, second, third, fourth, fifth, and sixth locations are spaced substantially uniformly from each other in a circumferential direction.

6. The flexible line trimmer head according to claim 5 wherein there are first and second tabs and first and second notches on the first and second housing parts, the first tab and first notch configured to cooperate with each other to key the first and second housing parts against relative movement around the operating axis at one location and the second tab and second notch are configured to cooperate with each other to key the first and second housing parts against relative movement around the operating axis at a location spaced circumferentially from the one location, the one location and the location spaced circumferentially from the one location each spaced from where the cooperating connector pairs are located.

7. The flexible line trimmer head according to claim 6 wherein the first tab has a different shape than the second tab.

8. The flexible line trimmer head according to claim 6 wherein the first tab has a different circumferential dimension than the second tab.

9. The flexible line trimmer head according to claim 1 wherein each of the cooperating connector pairs has the same construction as the first cooperating connector pair.

10. The flexible line trimmer head according to claim 1 wherein the first repositionable arm is a cantilevered arm that bends to allow the surface/edge on the first repositionable arm to move in radial opposite directions.

11. The flexible line trimmer head according to claim 10 wherein the one of the first and second housing parts comprises a molded body and the first repositionable arm is molded as one part of the body.

12. The flexible line trimmer head according to claim 1 wherein the spool has a core and further in combination with a supply of flexible line wrapped around the spool core.

13. The flexible line trimmer head according to claim 1 wherein the housing has a top and a bottom spaced axially from the top and the flexible line trimmer head further comprises a cap at the top of the housing that is configured to be turned guidingly around the operating axis to thereby turn the spool relative to the housing parts around the operating axis.

14. The flexible line trimmer head according to claim 1 wherein the flexible line trimmer head is configured so that an engaged drive causes the spool to turn the first and second housing parts around the operating axis.

15. The flexible line trimmer head according to claim 1 wherein the first and second housing parts make up a housing unit and there are components cooperating between the spool and housing unit that are configured to allow incremental turning of the housing unit relative to the spool upon the housing unit and spool being momentarily axially moved relative to each other with the housing unit driven around the operating axis.

16. The flexible line trimmer head according to claim 1 wherein the first and second housing parts make up a housing unit and a spring biasing structure urges the housing unit in one axial direction relative to the spool.

17. A housing unit comprising the first and second housing parts in claim 1.

18. The housing unit according to claim 17 wherein the first and second housing parts have cooperating connector pairs at at least four locations, each of the locations spaced: a) radially from the operating axis; and b) in a circumferential direction from the other locations.

19. The housing unit according to claim 18 wherein first and second of the cooperating connector pairs are at diametrically opposite first and second of the locations and are substantially symmetrical on opposite sides of a first reference plane including the operating axis and third and fourth of the cooperating connector pairs are at diametrically opposite third and fourth of the locations and are substantially symmetrical on opposite sides of a second reference plane including the operating axis, wherein the first and second reference planes are non-orthogonal to each other.

20. The flexible line trimmer head according to claim 1 wherein an edge portion bounding the first notch and an edge portion on the first tab cooperate over a substantial axial extent to avoid skewing of a relationship between the central axes of the first and second housing parts.

21. The flexible line trimmer head according to claim 1 wherein there is a second tab on one of the first and second housing parts and a second notch on the other of the first and second housing parts that cooperate with each other as the first tab and first notch cooperate as the first and second housing parts are changed between the first and second states and the first tab has a different shape than the second tab.

22. A flexible line trimmer head comprising:
a housing comprising a first part and a second part, the housing having an operating axis;
a spool around which a supply of flexible line can be wrapped,
the first and second housing parts configured to be moved axially relative to each other between: a) a first state wherein the first and second housing parts are separated from each other; and b) a second state wherein the first and second housing parts are operatively connected,
the housing and spool configured so that the spool: a) is maintained in an operative position on the housing with the first and second housing parts in the second state; and b) can be separated from the housing with the first and second housing parts in the first state; and
the flexible trimmer head further comprising a connecting assembly configured to be engaged by a drive that is operated to cause the first and second housing parts in the second state to be driven around the operating axis,
the first and second housing parts having cooperating connector pairs at at least three locations,
the cooperating connector pairs at each location configured to block movement of the first and second housing parts axially away from each other with the first and second housing parts in the second state,
each of the locations spaced: a) radially from the operating axis; and b) in a circumferential direction from the other locations,
wherein there is a first tab on one of the first and second housing parts and a first notch on the other of the first and second housing parts, the first tab and first notch spaced from the cooperating connector pairs and configured to cooperate with each other to key the first and second housing parts against relative movement around the operating axis,
wherein the first tab is movable into and out of the first notch as the first and second housing parts are changed back and forth between the first and second states without requiring any direct manipulation of the first tab by a user,
wherein the other of the first and second housing parts has an annular outer wall with an axial extent and the first notch extends through the annular outer wall, and the first notch and the first tab extend over a substantial portion of the axial extent of the annular outer wall so as to stabilize the joined housing parts.

23. A housing unit comprising the first and second housing parts in claim 22.

\* \* \* \* \*